April 17, 1945.  T. I. RESS  2,374,038

MOTION PICTURE FILM DRIVE MECHANISM

Filed Feb. 7, 1944   2 Sheets-Sheet 1

INVENTOR.
Thomas I. Ress
BY Clarence E. Threedy
His Attorney

April 17, 1945.    T. I. RESS    2,374,038
MOTION PICTURE FILM DRIVE MECHANISM
Filed Feb. 7, 1944    2 Sheets-Sheet 2

INVENTOR.
Thomas I. Ress
BY
His Attorney

Patented Apr. 17, 1945

2,374,038

UNITED STATES PATENT OFFICE 2,374,038

MOTION PICTURE FILM DRIVE MECHANISM

Thomas I. Ress, Chicago, Ill., assignor to De Vry Corporation, Chicago, Ill., a corporation of Illinois Application February 7, 1944, Serial No. 521,342

5 Claims. (Cl. 242—55)

This invention relates to certain new and useful improvements in motion picture film drive mechanism and more specifically to a means for transmitting driving power from the film reel to the take-up reel of the motion picture camera, and has for its principal object the provision of an improved construction of this character, which will be highly efficient in use and economical in manufacture.

Among the salient objects of this invention is to provide a camera of the type hereinafter described, with a pair of film supporting reels, in which the movement of the film reel is transmitted to the take-up reel, thus resulting in a non-slipping, uniform, and constant drive between the two reels, consequently resulting in better and more refined photography.

A still further object of the invention is the provision in such a camera, of a latch which prevents the closing of the camera door without first disposing the transmitting drive mechanism into engagement with the film reel and the take-up reel, thus assuring the operator that the transmitting drive mechanism is disposed in its proper driving position with respect to the two reels.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
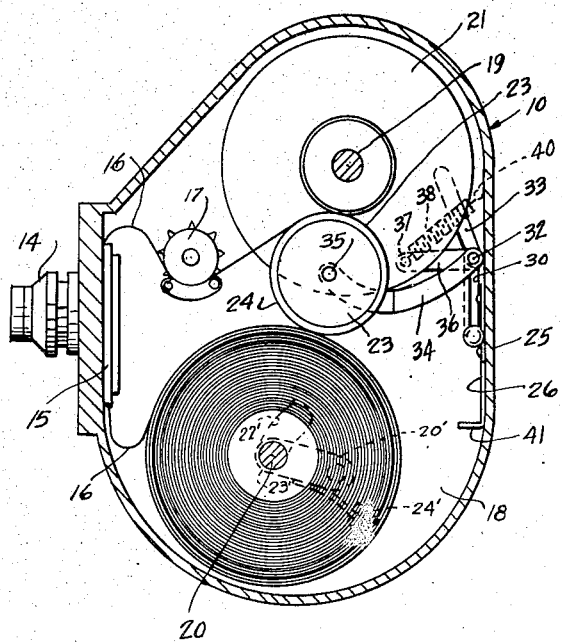
Fig. 1 is a vertical sectional detail view of a camera embodying the invention, showing the take-up reel with the film confined thereon.

The drawings illustrate the preferred form of construction of my invention. In this connection, a camera is indicated generally at 10, and this camera includes a housing 11 having a removable back wall 12 and a hinged door 13. The lens assembly is indicated at 14, to the rear of which is arranged the film gate 15 through which the film 16 is fed by means of a sprocket 17. Within the housing 11 is arranged a partition 18. This partition 18 carries a stud 19. On the stud 19 is adapted to be mounted the loaded film reel 21. A stud 20 on which the take-up reel 22 is mounted is carried by an arm 20' and operates through a slot 22' formed in the wall 18.

Disposed so as to be moved into contact with the film on the reels 21 and 22 is a transmission wheel 23 having a tread 24 formed of rubber or other non-slip material. This wheel 23 is adapted to engage the film on the reels 21 and 22, whereby rotation of the reel 21 will be transmitted to the reel 22 through the medium of this wheel 23. This wheel is supported for movement into engagement with the film by the following described mechanism.

Figure 4:
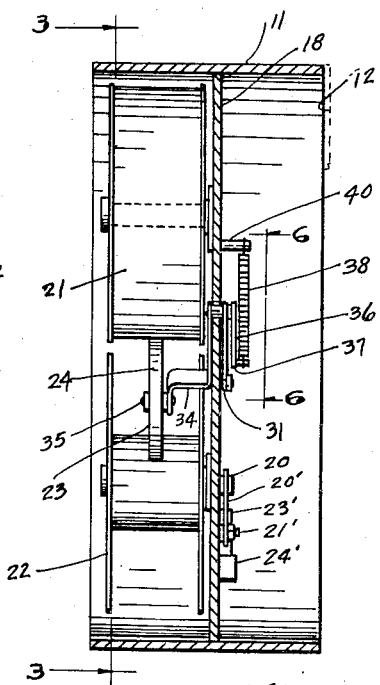
Fig. 4 is a sectional detail view taken substantially on line 4—4 of Fig. 3.

The arm 20', Fig. 4, is pivotally carried as at 21' by the wall 18. A spring leaf 23' bears against the arm 20' to hold the film on the take-up reel 22 against the tread 24 of the wheel 23, said spring leaf 23' being carried by the wall 18 as at 24'.

Figure 5:
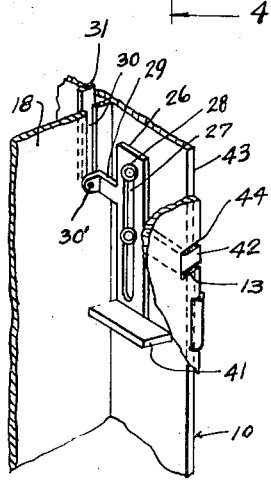
Fig. 5 is a fragmentary perspective view of the camera housing illustrating the door latch mechanism associated therewith.
Figure 6:
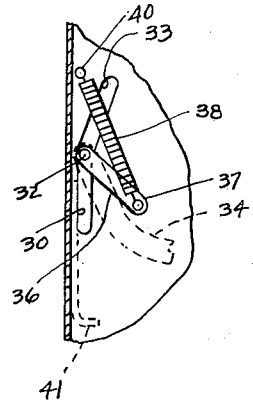
Fig. 6 is a fragmentary sectional detail view taken substantially on line 6—6 of Fig. 4.

Mounted upon the wall 25 of the housing 11 is a plate 26. This plate 26 (Fig. 5) has an elongated slot 27 formed therein through which project the mounting lugs 28. Formed on this plate 26 is an arm 29 which carries a stud shaft 30' projecting through a slot 30 formed in the partition 18. Carried by this stud shaft 30' is a link 31, which at its upper end carries a stud 32, which projects through and is mounted for operation in a slot 33 formed in the partition 18. Fixed to this stud 32 is a lever 34, and to this lever 34 is connected the wheel 23 by means of the pintle 35. Fixed to the stud 32 is an arm 36, one end of which, as at 37, is connected to a spring 38, the opposite end portion of the spring being connected to the partition as at 40. When the lever 34 is disposed in the position shown in Fig. 1, the pull of the spring 38 on the arm 36 tends to pivot this arm 36 and consequently the lever 34 in a clockwise direction about the stud 32.

The arrangement is such that as the film unwinds from the film reel 21 and winds upon the take-up reel 22, lever 34 will pivot about the stud 32 and thereby always maintain contact with the film surfaces, whereby the rotation of the film 16 will be transmitted through the wheel 23 to the take-up reel 22 for the purposes hereinbefore stated.

Figure 2:
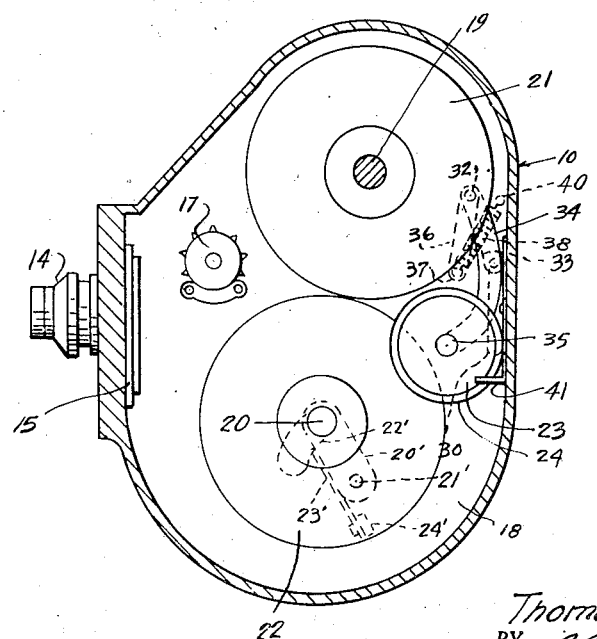
Fig. 2 is a similar sectional detail view, illustrating the drive transmitting means in an inoperative position with respect to the two reels.
Figure 3:
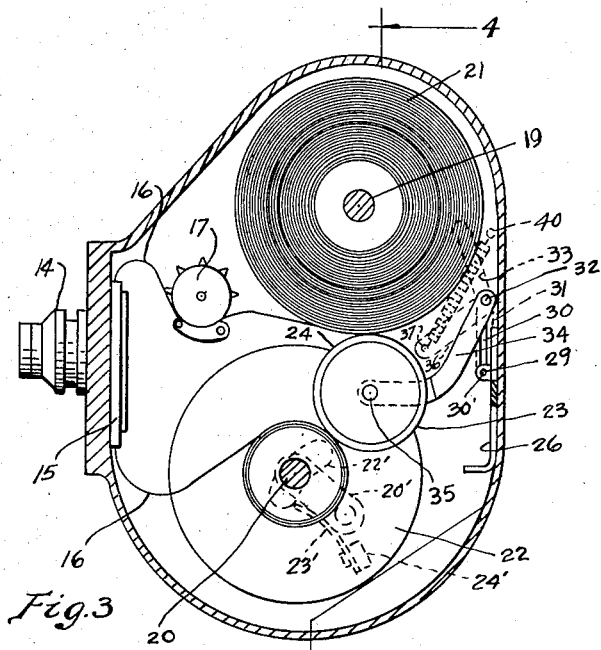
Fig. 3 is a similar sectional detail view to that shown in Figs. 1 and 2, taken substantially on line 3—3 of Fig. 4, but showing the drive transmitting mechanism in driving position, with the film confined upon the film reel.

On this plate 26 is provided a finger 41, which facilitates moving the plate longitudinally. This plate is moved in a longitudinal direction to dispose the wheel 23 in the position illustrated in Fig. 2, whereby to facilitate removal of the reel 21 from the stud 19 and the mounting of a new reel upon the stud 19. With the wheel 23 disposed in the position illustrated in Fig. 1, the loaded take-up reel 22 may be removed from the stud 20. When this plate 26 is moved upwardly, the link 31 causes the stud 32 to rise in the slot 33, and in the upward movement of the stud 32 in the slot 33, the lever 34 will be pivoted to the position shown in Fig. 2 under the action of the spring 38 to dispose the wheel 23 from contact with the film surface; the pull of the spring 38, in such case, tending to pivot the lever 34 and consequently the arm 36 in an anti-clockwise direction about the stud 32.

To make sure that the operator has disposed the wheel 23 in film-engaging position after the camera has been loaded, I provide on the plate 26 an angular extension 42. This extension rests upon the edge 43 of the wall 25 and unless it is in a proper position, that is, a position with the wheel 23 engaging the surface of the film, the door 13 thereof will engage the extension and be prevented from closing. In the door 13 there is provided a cut-out portion 44 having felt-lined edges to prevent light penetration into the housing 11 and which portion is adapted to receive the extension 42 when the plate 26 is in the position shown in Fig. 5, and thus permit the door 13 to be closed.

From the foregoing description, it is obvious that a camera of the motion picture type is provided in which there is a constant uniform drive between the film and the take-up reel, thus resulting in better and more efficient photography by a mechanism which is simple in structure and economical in manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A motion picture camera having a pair of spaced reel mounting studs, reels mounted on said studs, a friction drive means disposed between the reels and adapted to engage the peripheries of film rolls on said reels as the film is unwound from one reel and wound upon the other reel, means for adjusting said friction drive means into said position with respect to the surface of said film, said last-mentioned means including a latch member, and means providing connection between the latch member and said friction drive means.

2. A motion picture camera having a pair of spaced reel mounting studs, reels mounted on said studs, a friction drive means disposed between the reels and adapted to engage the peripheries of film rolls on said reels as the film is unwound from one reel and wound upon the other reel, means for adjusting said friction drive means into said position with respect to the surface of said film, said last-mentioned means including a latch member, means providing connection between the latch member and said friction drive means, a door for said camera, and an extension on said latch member adapted to block the closing of said door when said latch member is disposed in a position with the friction drive means out of engagement with the surface of said film.

3. A motion picture camera comprising a housing, a pair of spaced reel mounting studs within said housing, a pair of reels mounted on the studs, a latch member slidably supported by said housing, an arm pivotally connected to said latch member, a wheel member carried by said arm and adapted to engage the peripheries of film rolls on said reels during the winding of the film from one of said reels onto the other of said reels, said housing having a slot formed therein, and a pintle providing the connection between said arm and said latch member and movable in said slot to dispose said wheel member from engagement with the surface of said film when said latch member is moved in one direction.

4. A motion picture camera comprising a housing, a pair of spaced reel mounting studs within said housing, a pair of reels mounted on the studs, a latch member slidably supported by said housing, an arm pivotally connected to said latch member, a wheel member carried by said arm and adapted to engage the peripheries of film rolls on said reels during the winding of the film from one of said reels onto the other of said reels, said housing having a slot formed therein, a pintle providing the connection between said arm and said latch member and movable in said slot to dispose said wheel member from engagement with the surface of said film when said latch member is moved in one direction, and spring means for urging said wheel member into engagement with the surfaces of said film.

5. A motion picture camera comprising a housing, a pair of spaced reel mounting studs within said housing, a pair of reels mounted on the studs, a latch member slidably supported by said housing, an arm pivotally connected to said latch member, a wheel member carried by said arm and adapted to engage the peripheries of film rolls on said reels during the winding of the film from one of said reels onto the other of said reels, said housing having a slot formed therein, a pintle providing the connection between said arm and said latch member and movable in said slot to dispose said wheel member from engagement with the surface of said film when said latch member is moved in one direction, a door for said housing, and an extension on said latch member adapted to block the closing of said door when said latch member is disposed in a position to dispose the wheel member from engagement with the surface of said film.

THOMAS I. RESS.